(12) United States Patent
You et al.

(10) Patent No.: US 11,504,722 B2
(45) Date of Patent: Nov. 22, 2022

(54) NON-EXHAUST FINE DUST COLLECTING DEVICE USING TRIBOELECTRICITY

(71) Applicant: POSTECH Research and Business Development Foundation, Pohang-si (KR)

(72) Inventors: Donghyun You, Pohang-si (KR); Soo Hwan Jeon, Gimhae-si (KR); Sang Seung Lee, Seoul (KR); Junshin Park, Pohang-si (KR); Mario Ruettgers, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 281 days.

(21) Appl. No.: 16/959,227

(22) PCT Filed: Jan. 9, 2019

(86) PCT No.: PCT/KR2019/000350
§ 371 (c)(1),
(2) Date: Jun. 30, 2020

(87) PCT Pub. No.: WO2019/139353
PCT Pub. Date: Jul. 18, 2019

(65) Prior Publication Data
US 2020/0331005 A1 Oct. 22, 2020

(30) Foreign Application Priority Data
Jan. 11, 2018 (KR) .................. 10-2018-0003879

(51) Int. Cl.
*B03C 3/47* (2006.01)
*B03C 3/82* (2006.01)
(Continued)

(52) U.S. Cl.
CPC ............... *B03C 3/47* (2013.01); *B03C 3/82* (2013.01); *B03C 3/08* (2013.01); *B03C 3/49* (2013.01); *B03C 2201/30* (2013.01); *B60S 1/685* (2013.01)

(58) Field of Classification Search
CPC combination set(s) only.
See application file for complete search history.

(56) References Cited

U.S. PATENT DOCUMENTS

| 6,821,320 B1 * | 11/2004 | Miyazaki | ................ B03C 3/011 |
| | | | 96/17 |
| 2005/0000197 A1 * | 1/2005 | Krantz | .................. B03C 1/0332 |
| | | | 55/385.3 |

(Continued)

FOREIGN PATENT DOCUMENTS

| CN | 2052369 | 2/1990 | |
| CN | 107282302 A | * 10/2017 | ............. B01D 45/04 |

(Continued)

OTHER PUBLICATIONS

Translation of WO2015199412 (Year: 2015).*

(Continued)

*Primary Examiner* — Christopher P Jones
*Assistant Examiner* — Sonji Turner
(74) *Attorney, Agent, or Firm* — Lex IP Meister, PLLC

(57) ABSTRACT

A non-exhaust fine dust collecting apparatus using friction electricity is disclosed. An exemplary embodiment of the present invention provides a non-exhaust fine dust collecting apparatus using friction electricity, including: an air pipe mounted in a vehicle and provided with an inlet through which fine dust generated in a vehicle and charged with a first polarity flows together with air; and a dust collector mounted at a side of an outlet of the air pipe and charged (Continued)

with a second polarity that is opposite to the first polarity to collect the fine dust charged with the first polarity.

10 Claims, 10 Drawing Sheets

(51) Int. Cl.
  *B03C 3/08* (2006.01)
  *B03C 3/49* (2006.01)
  *B60S 1/68* (2006.01)

(56) References Cited

U.S. PATENT DOCUMENTS

| | | | |
|---|---|---|---|
| 2008/0029357 A1* | 2/2008 | Krantz | B60L 15/2036 219/202 |
| 2011/0214568 A1* | 9/2011 | Krantz | F16D 65/0031 55/385.3 |

FOREIGN PATENT DOCUMENTS

| | | | | |
|---|---|---|---|---|
| JP | 2017006907 A | * | 1/2017 | ............. B08B 15/00 |
| KR | 20-1999-0002130 | | 1/1999 | |
| KR | 10-2002-0003983 | | 1/2002 | |
| KR | 10-2004-0063094 | | 7/2004 | |
| KR | 10-0725996 | | 6/2007 | |
| KR | 10-1187116 | | 9/2012 | |
| KR | 10-1511663 | | 4/2015 | |
| KR | 10-2016-0005406 | | 1/2016 | |
| KR | 10-1684353 | | 12/2016 | |
| KR | 101684353 B1 | * | 12/2016 | |
| KR | 10-2017-0112172 | | 10/2017 | |
| KR | 2017112172 A | * | 10/2017 | ............. B01D 45/04 |
| KR | 10-1801748 | | 11/2017 | |
| WO | WO-2015199412 A1 | * | 12/2015 | ................ B60S 1/68 |

OTHER PUBLICATIONS

Translation of KR-2017112172 (Year: 2017).*
KIPO, PCT Search Report & Written Opinion of PCT/KR2019/000350 dated May 9, 2019.

* cited by examiner

40(42)

40(41)

40(42)

NON-EXHAUST FINE DUST COLLECTING DEVICE USING TRIBOELECTRICITY

CROSS-REFERENCE TO RELATED APPLICATION

This application claims priority to and benefits of Korean Patent Application No. 10-2018-0003879, filed in the Korean Intellectual Property Office on Jan. 11, 2018, the entire contents of which are incorporated herein by reference.

BACKGROUND OF THE INVENTION

(a) Field of the Invention

The present invention relates to a non-exhaust fine dust collecting apparatus using friction electricity, which collects fine dust generated by non-exhaust when driving a vehicle.

(b) Description of the Related Art

Fine dust generated by vehicles accounts for most of the fine dust generated in Korea. The government supports early scrapping of old diesel vehicles manufactured before 2005 (based on EURO3 emission standards), increases support for electric vehicles such as increasing charging stations, and is planning to supply 10% of the nation's total vehicles as eco-friendly vehicles such as hybrid vehicles or electric vehicles by 2020, in order to reduce the fine dust generated by vehicles.

In addition, in the future, emission standards for nitrogen oxides, which cause fine dust, will be strengthened more than current standards. Fine dust generated in vehicles may be classified into exhaust fine dust and non-exhaust fine dust depending on its source. All of the above policies are part of efforts to reduce fine dust from vehicle exhaust gas. There are almost no countermeasures against non-exhaust fine dust.

It is known that a generation ratio of non-exhaust fine dust among the fine dust generated in the entire vehicle is relatively low. However, according to recent foreign research papers, the proportion of fine dust caused by exhaust gas is gradually lowered over time, and non-exhaust fine dust is increasing. Eventually, the non-exhaust fine dust is expected to account for most of the fine dust.

Despite these predictions, there have been steady studies and technical advances on fine dust from exhaust, but studies on non-exhaust fine dust from tires/asphalt, brake pads/disk pads, and other friction sources are relatively insignificant.

For example, an existing dust collecting apparatus is equipped with a filter and a blower at a rear side of a vehicle wheel, and collects and filters fine dust generated by friction and wear on the tire and a road surface in a cyclone method. That is, it does not remove the non-exhaust fine dust by using friction electricity.

In addition, another existing dust collecting apparatus is equipped with a water blocking means including a dust opening/closing valve at a rear side of the vehicle wheel to collect dust generated from tires and brake pads, and a dust collecting duct is also added to the brake calipers to collect dust by flow only. That is, it does not remove the non-exhaust fine dust by using friction electricity.

In addition, another existing dust collecting apparatus periodically sprays an air jet to the brake disk to remove generated dust, and collects dust through a guide. That is, it does not remove the non-exhaust fine dust.

SUMMARY OF THE INVENTION

Technical Problem

An exemplary embodiment of the present invention has been made in an effort to provide a non-exhaust fine dust collecting apparatus using friction electricity, which collects non-exhaust fine dust by using an actual fluid flow and friction electricity.

In addition, exemplary embodiments of the present invention have been made in an effort to provide a non-exhaust fine dust collecting apparatus using friction electricity, which collects non-exhaust fine dust (e.g. tires/asphalt and brake pads/disk pads) generated during vehicle driving by including a guide (including a venturi) that considers an actual fluid flow and a dust collecting apparatus that utilizes friction electricity.

Technical Solution

An exemplary embodiment of the present invention provides a non-exhaust fine dust collecting apparatus using friction electricity, including: an air pipe mounted in a vehicle and provided with an inlet through which fine dust generated by a vehicle and charged with a first polarity flows together with air; and a dust collector mounted at a side of an outlet of the air pipe and charged with a second polarity that is opposite to the first polarity to collect the fine dust charged with the first polarity.

The air pipe may include a wheel well of the vehicle and a guide mounted to the wheel well, the inlet may be formed toward the guide to open toward a wheel disposed inside the wheel well, and may open toward a rear side of the wheel.

The inlet may be formed in a position where a rate of air flow between the wheel and the wheel well slows down and is stagnant.

The inlet may include a first inlet configured to open downward to face a first stagnation point that is formed vertically above a central axis of the wheel; and a second inlet configured to open forward to face a second stagnation point that is formed at a horizontal rear side from the central axis of the wheel.

The outlet may include a first exit formed as a vertical gap between a lower end of the guide and a lower end of the wheel well at a rear side of the guide, to open a rear side thereof, and a second exit formed as a horizontal gap between the first exit and the dust collector at a rear side of the first exit, to open a rear side thereof.

The dust collector may be spaced rearward from the first exit to form the second exit, and is installed in a side sill or a rear body of the vehicle.

The fine dust may be charged with the first polarity caused by friction between a tire of asphalt and a wheel or between a brake pad and a disk pad.

The dust collector may include: a duct configured to pass a flow of the fine dust; a plurality of charging plates installed inside the duct to be charged with the second polarity by applying a charging voltage; and a filter installed on the charging board to collect fine dust.

The air pipe may further include a venturi inside the inlet.

The air pipe may further include a micropath at opposite sides of the inlet, and the micropath may allow air to flow from an outside of the inlet to a recess portion of a venturi disposed inside the air pipe.

The air pipe and the inlet may be installed by analyzing a streamline of an air flow formed between a wheel and a wheel well of a vehicle.

The inlet may be disposed at a stagnation point where a rate of the air flow is slow and it is stagnant by allowing a movement of the wheel rotating in a first direction to act on the air flow flowing in an opposite direction to the first direction.

Advantageous Effects

According to exemplary embodiments of the present invention, fine dust may be effectively collected by using a dust collector that is mounted in a vehicle at an outlet side of an air pipe and is charged with a second polarity by introducing fine dust charged with a first polarity through the air pipe mounted in the vehicle.

Further, an inlet (first and second inlets) of the air pipe is provided at (first and second) stagnation points where a rate of flow is slow and it is stagnant by a clockwise rotation of a wheel and a clockwise rotation of the flow by analyzing the streamline of an actual flow formed between the wheel of the vehicle and a wheel well, and thus the charged fine dust can be effectively introduced.

In addition, since the dust collector is charged with the second polarity, the fine dust of the first polarity discharged to the outlet of the air pipe may be more effectively collected.

DETAILED DESCRIPTION OF THE EMBODIMENTS

Figure 1:
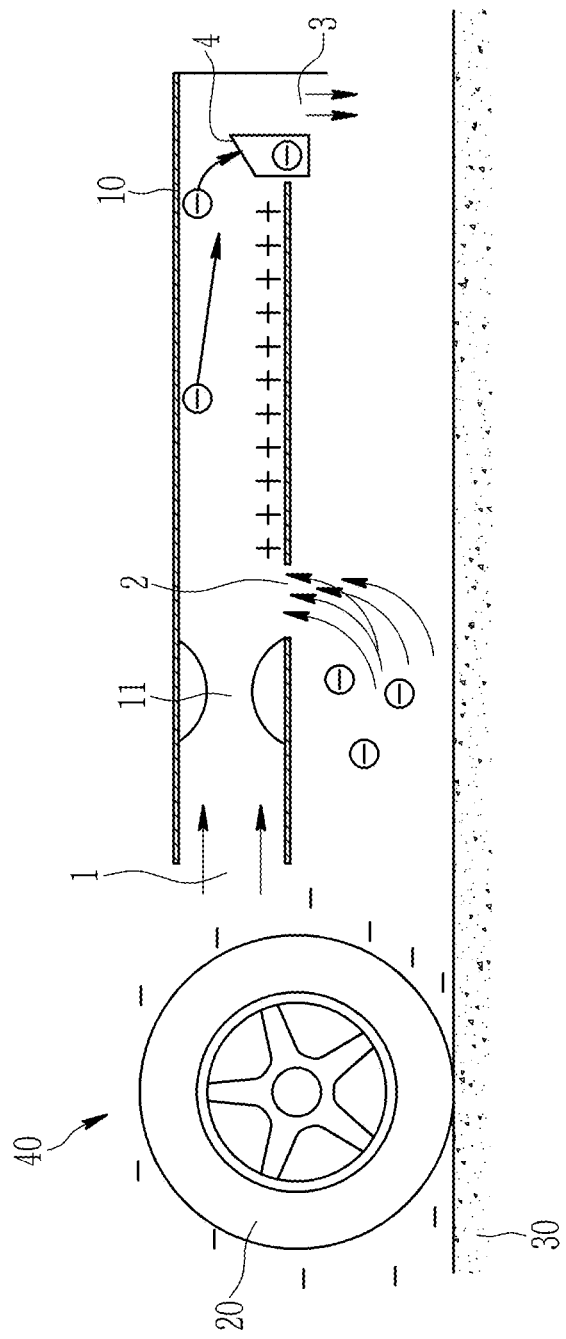
FIG. 1 illustrates a schematic view showing a non-exhaust fine dust collecting apparatus using friction electricity according to an exemplary embodiment of the present invention.

Hereinafter, the present invention will be described more fully with reference to the accompanying drawings, in which exemplary embodiments of the invention are shown.

As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

In this specification, redundant descriptions for the same constituent elements will be omitted.

In this specification, it is to be understood that when one component is referred to as being "connected" or "coupled" to another component, it may be connected or coupled directly to the other component or be connected or coupled to the other component with a further component intervening therebetween. In this specification, it is to be understood that when one component is referred to as being "connected or coupled directly" to another component, it may be connected to or coupled to the other component without being connected to a component intervening therebetween.

It is also to be understood that the terminology used herein is only for the purpose of describing particular examples, and is not intended to be limiting of the invention.

Singular forms are to include plural forms unless the context clearly indicates otherwise.

It will be further understood that terms "comprises" or "have" used in the present specification specifies the presence of stated features, numerals, steps, operations, components, parts, or a combination thereof, but do not preclude the presence or addition of one or more other features, numerals, steps, operations, components, parts, or a combination thereof.

In addition, as used herein, the term "and/or" includes any plurality of combinations of items or any of a plurality of listed items. In this specification, "A or B" may include "A", "B", or "A and B".

FIG. 1 illustrates a schematic view showing a non-exhaust fine dust collecting apparatus using friction electricity according to an exemplary embodiment of the present invention. Referring to FIG. 1, the non-exhaust fine dust collecting apparatus according to the present exemplary embodiment is configured to allow a filter 4 provided at a side of an outlet 3 to collect fine dust that is charged (−), and that is generated and charged by friction between a tire 20 and fixed asphalt 30 of a wheel 40 rotating at a vehicle, while introducing the fine dust that is charged (−) into first and second inlets 1 and 2 of an air pipe together with surrounding air to control and induce it.

The air pipe 10 makes it possible to utilize low pressure inside a venturi 11 provided at the first inlet 1 and inside the first inlet 1 and an aerodynamic entrainment phenomenon of the second inlet 2.

That is, the air pipe 10 increases inflow of air, blocks and filters out heavy objects such as stones, gravel, and water or particles, and allows a main flow direction component leading to the outlet 3 through which it is discharged by introducing the charged (−) fine dust into an inside thereof.

The air pipe 10 introduces the fine dust, generated from a driving vehicle and charged (−) with a first polarity, and applies an electric field charged with a second polarity that is opposite to that of the charged (−) fine dust thereto, and thus it is possible to induce only the fine dust (−) into the filter 4 provided at the side of the outlet 3 without interfering with the flow of the main flow direction component leading to the outlet 3. That is, the induced and controlled fine dust (−) may be collected by the filter 4.

The first polarity may be a negative or positive polarity, and the second polarity may be opposite to the first polarity.

For example, the first polarity of the fine dust may be a negative polarity, and the second polarity may be a positive polarity.

Figure 2:
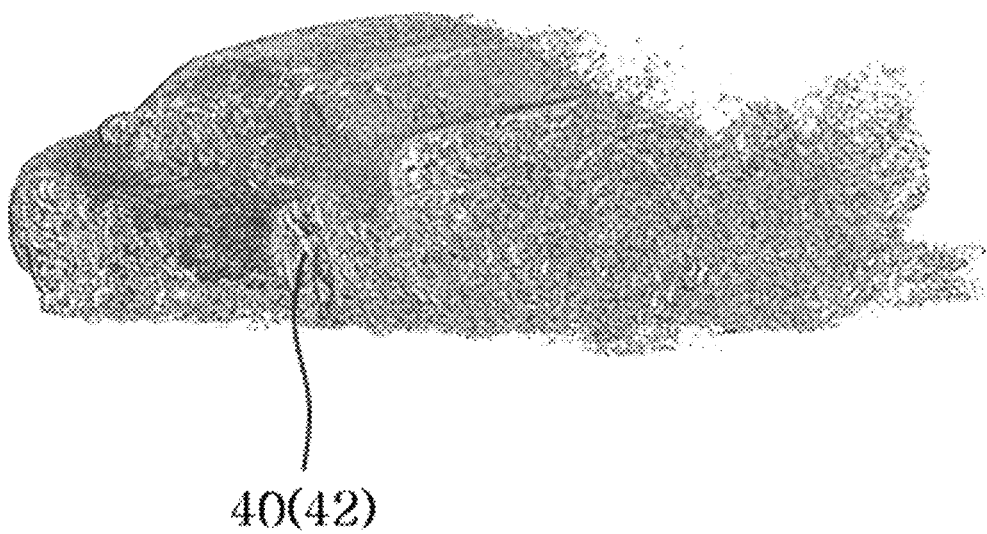
FIG. 2 illustrates a rear image visualizing a vortex of a flow passing through a vehicle.
Figure 3:
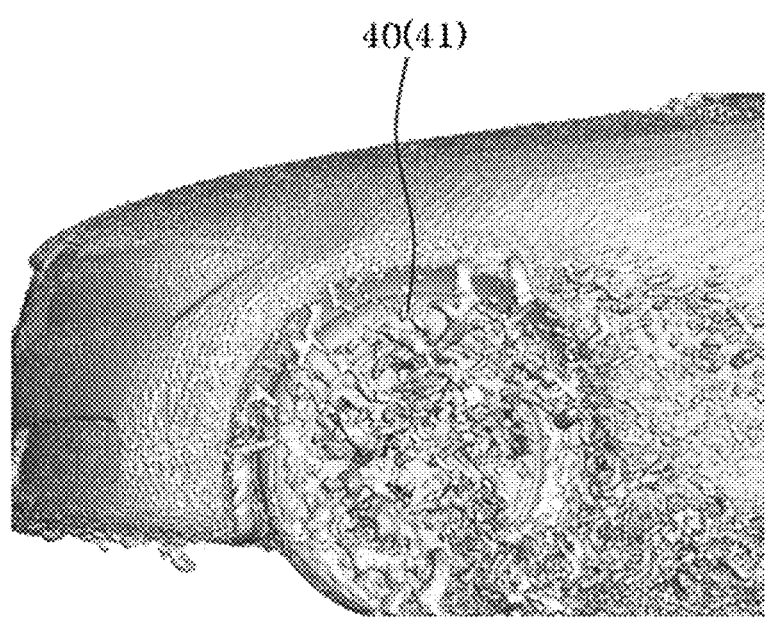
FIG. 3 is a side image visualizing a vortex of a flow passing through a vehicle.
Figure 4:
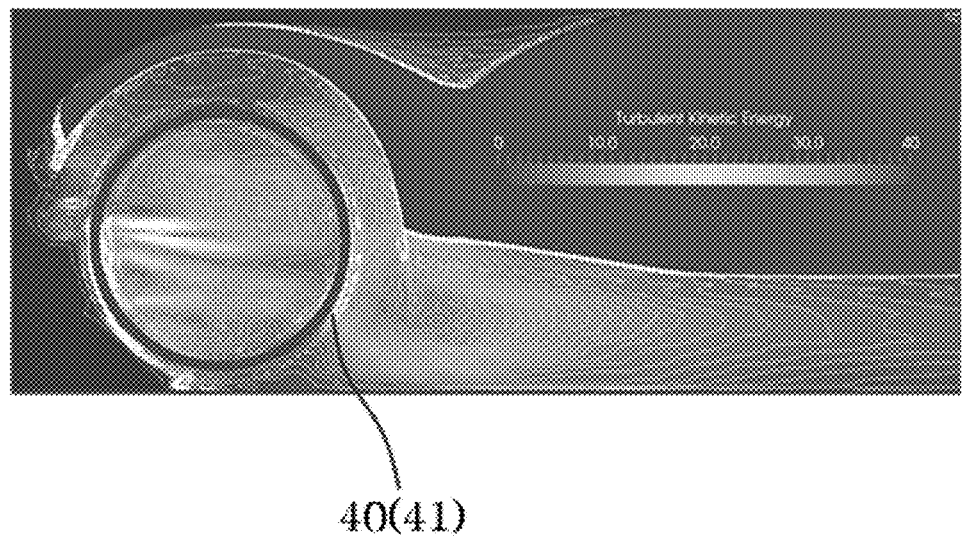
FIG. 4 illustrates an image of a front wheel visualizing time-averaged turbulent kinetic energy.
Figure 5:
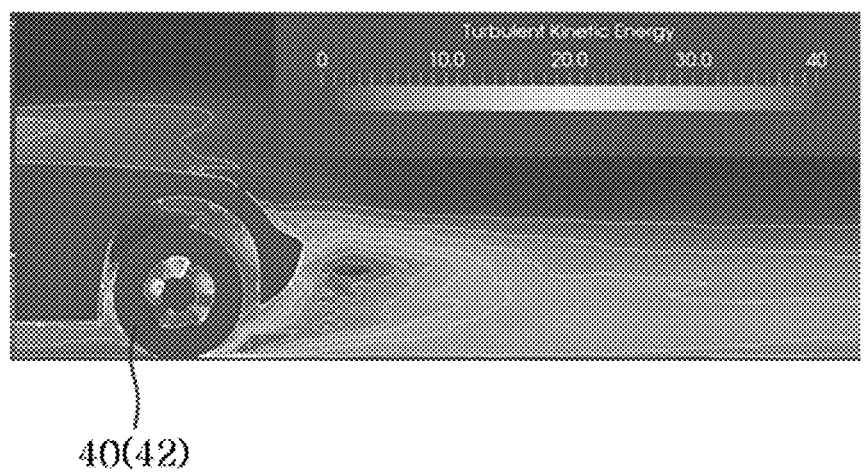
FIG. 5 illustrates an image of a rear wheel visualizing time-averaged turbulent kinetic energy.
Figure 6:
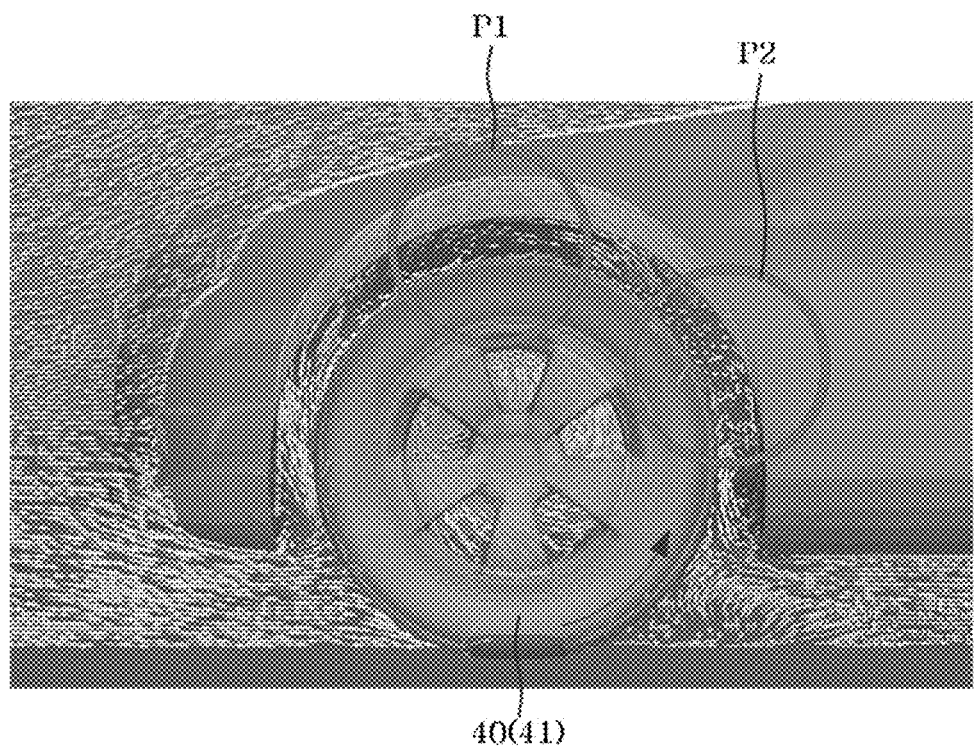
FIG. 6 illustrates an image for checking installation positions of a streamline around a wheel and an optimal fine dust collecting apparatus.

FIG. 2 illustrates a rear image visualizing a vortex of a flow passing through a vehicle, FIG. 3 is a side image visualizing a vortex of a flow passing through a vehicle, FIG. 4 illustrates an image of a front wheel visualizing time-averaged turbulent kinetic energy, FIG. 5 illustrates an image of a rear wheel visualizing time-averaged turbulent kinetic energy, and FIG. 6 illustrates an image for checking installation positions of a streamline around a wheel and an optimal fine dust collecting apparatus.

Referring to FIG. 2 to FIG. 4, a result of detailed flow analysis was compared with the drag and a pressure coefficient of a vehicle measured in an experiment to verify accuracy. FIG. 2 and FIG. 3 respectively visualizes vortices of flow around the wheels 40 (42 and 41) at rear and side of the vehicle. FIG. 4 and FIG. 5 visualize turbulent kinetic energy and the streamline in front and rear wheels 41 and 42 of the vehicle.

Referring to FIG. 2 and FIG. 3, it can be seen that a large air vortex is generated around the wheels 40 (42 and 41). That is, since complexity of the flow is large around the wheels 40 (42 and 41), it is important to design a position of the fine dust collecting apparatus.

In addition, since a large amount of air flow is separated from the wheels 40 (42 and 41) to lose momentum, a shape of the non-exhaust fine dust collecting apparatus alone does not have a significant adverse effect on the drag of the vehicle.

Referring to FIG. 4 and FIG. 5 again, flow separation frequently occurs around the wheels 40 (41 and 42) due to the complicated shape of the flow around the wheels 40 (41 and 42). Accordingly, high turbulent kinetic energy is observed around the wheels 40 (41 and 42) and in the flow passing through wheels 40 (41 and 42).

Referring to FIG. 2 to FIG. 6, fine dust mixing caused by turbulent flow as well as fine dust mixing due to molecular motion occurs largely at a portion where the high turbulence motion energy is exhibited. Therefore, mixing and generation of fine dust will greatly occur in a region where turbulent kinetic energy is high, and a fine dust collecting apparatus may be provided in a vicinity of this region.

As illustrated in FIG. 6, as a result of analyzing the streamline of the flow around the wheel 40 (41), a movement of the wheel 40 (41) rotating in one direction, e.g., in a counterclockwise direction as illustrated in FIG. 6, and an air flow rotating in a clockwise direction compete each other, and thus first and second stagnation points P1 and P2, in which it stays due to a slow flow rate, i.e., a rate of the air flow is reduced and it is relatively stagnant compared to the surroundings, occur.

When the non-exhaust fine dust collecting apparatus is installed in the vicinity of the first and second stagnation points P1 and P2, a time for fine dust particles to float inside the non-exhaust fine dust collecting apparatus may be long. When the time for the fine dust to float inside the non-exhaust dust collecting apparatus becomes longer, a time for an electric force to act according to the first polarity of the fine dust generated by the friction electricity increases. Accordingly, a dust collecting effect of fine dust may be improved.

As such, an exemplary embodiment sets installation positions of dust collectors 51 and 52 through a complex flow analysis around the rotating wheel 40 (41), and thus a collection rate of the dust collectors 51 and 52 having the second polarity may be maximized.

Figure 7:
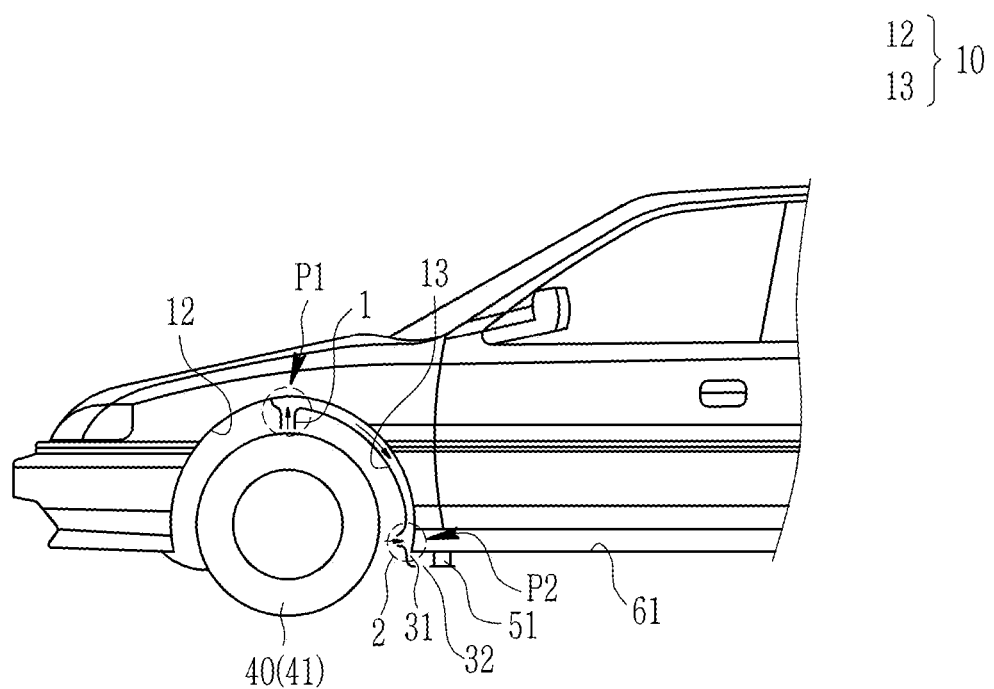
FIG. 7 illustrates a state diagram of a non-exhaust fine dust collecting apparatus using friction electricity installed at a front wheel side of a vehicle according to an exemplary embodiment of the present invention.
Figure 8:
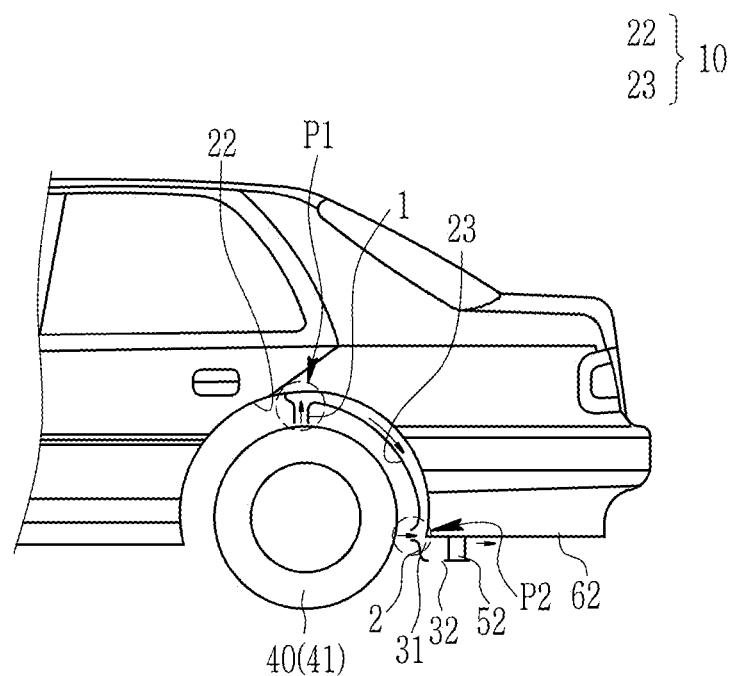
FIG. 8 illustrates a state diagram of a non-exhaust fine dust collecting apparatus using friction electricity installed at a rear wheel side of a vehicle according to an exemplary embodiment of the present invention.

FIG. 7 illustrates a state diagram of a non-exhaust fine dust collecting apparatus using friction electricity installed at a front wheel side of a vehicle according to an exemplary embodiment of the present invention, and FIG. 8 illustrates a state diagram of a non-exhaust fine dust collecting apparatus using friction electricity installed at a rear wheel side of a vehicle according to an exemplary embodiment of the present invention.

Referring to FIG. 7 and FIG. 8, a non-exhaust fine dust collecting apparatus is installed at a side of the front wheel 41 and a side of the rear wheel 42 of the vehicle, and include wheel wells 12 and 22, guides 13 and 23 installed in wheel wells 12 and 22, and dust collectors 51 and 52 provided at an outlet of the air pipe 10 to form the air pipe 10 of FIG. 1.

The guides 13 and 23 are respectively coupled to first sides of the wheel wells 12 and 22, and the air pipe 10 includes the wheel wells 12 and 22 and the guides 13 and 23. For example, the guide 13 (23) may be provided to have an extended form along the wheel well 12 (22), may be disposed between the wheel well 12 (22) and the wheel 41 (42), and may be coupled to the wheel well 12 (22) to form a space between the guide 13 (23) and the wheel well 12 (22) so as to form the air pipe 10.

The first and second inlets 1 and 2 are formed in the guides 13 and 23, and are formed at positions corresponding to the first stagnant point P1 and the second stagnant point P2 where a rate of the air flow is reduced and it is stagnant. The first stagnation point P1 is set around a vertical upper side of the wheel 41 (42), and the second stagnation point P2 is set around a horizontal rear side of the wheel 41 (42).

For example, the first stagnation point P1 may be vertically positioned above a central axis of the wheel 41 (42), and the second stagnation point P2 may be horizontally positioned behind the central axis of the wheel 41 (42).

That is, the first inlet 1 may be opened downward in the guide 13 (23) corresponding to the first stagnation point P1, and the second inlet 2 may be opened toward a front side thereof in the guide 13 (23) corresponding to the second stagnation point P2.

The first outlet 31 is formed as a vertical gap between a lower end of the guide 13 (23) and a lower end of the wheel well 12 (22) at a rear side of the guide 13 (23), and is opened toward the rear side. That is, a rear end of the guide 13 (23), i.e., the lower end of the guide 13 (23), may be spaced downward from the lower end of the wheel well 12 (22), and a first outlet 31 may be defined between the lower end of the guide 13 (23) and the lower end of the wheel well 12 (22).

The dust collectors 51 and 52 are disposed at the rear of the first outlet 31, and may be installed at a side sill 61 and a rear body 62 of the vehicle, respectively. In addition, the dust collector 51 (52) may constitute a second outlet 32 formed by a horizontal gap between the dust collector 51 (52) and the first outlet 31. That is, the second outlet 32 which is opened as the first outlet 31 and the dust collector 51 (52) are spaced apart from each other may be formed.

The second outlet 32 may be downwardly opened between the guide 13 (23) and the dust collector 51 (52). Therefore, a small amount of heavy objects or particles such as gravel or sand flowing into the first and second inlets 1 and 2 are discharged to the second outlet 32.

Fine dust not generated by exhaust from a vehicle and charged with a first polarity and flowing into the first and second inlets 1 and 2 is discharged to the first outlet 31 and introduced into the dust collector 51 (52) charged to the opposite second polarity to be collected.

For example, when a vehicle is driven, non-exhaust fine dust generated by friction may be charged with the first polarity caused between asphalt and the tire of the wheel 40 and between a brake pad and a disk pad, and may be introduced into the dust collector 51 (52) charged with the second polarity through the first and second inlets 1 and 2 and the first outlet 31. The non-exhaust fine dust charged with friction electricity is controlled by an electric force, to be induced to the dust collector 51 (52).

Figure 9:
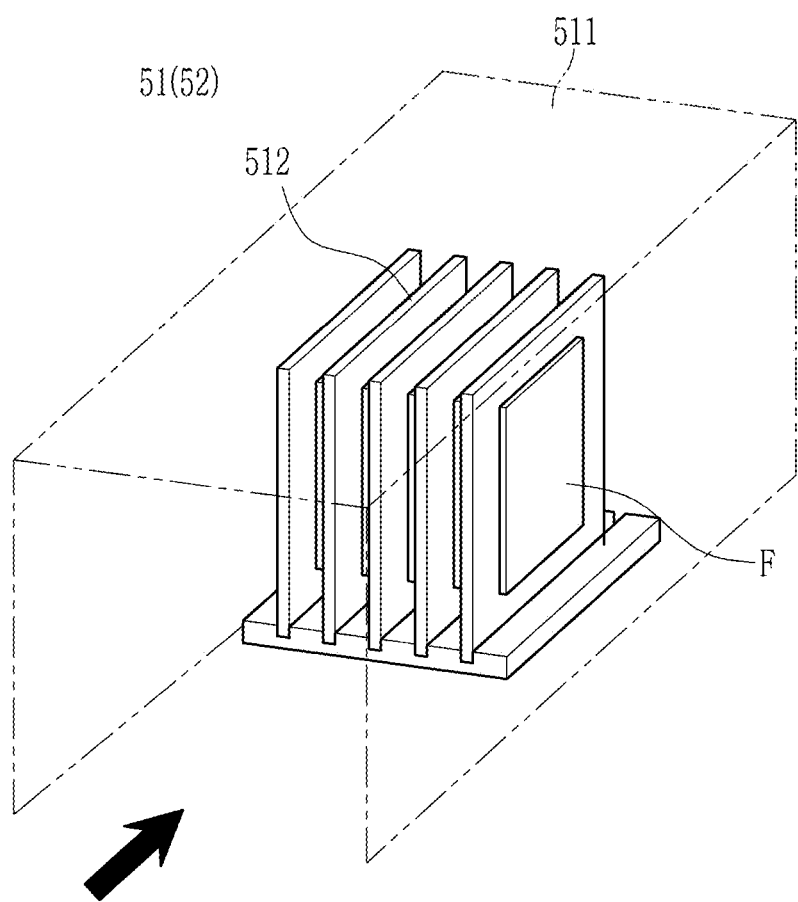
FIG. 9 illustrates a perspective view of a dust collecting apparatus installed in FIG. 7 and FIG. 8.

FIG. 9 illustrates a perspective view of a dust collecting apparatus installed in FIG. 7 and FIG. 8. Referring to FIG. 9, the dust collector 51 (52) includes a duct 511 through which a flow of the non-exhaust fine dust charged with the first polarity passes and a plurality of charging plates 512 installed in the duct 511 and charged with a second polarity by applying a charging voltage. A size of the duct 511 and a size and number of the charging plates 512 depend on the applied vehicle, and set a flow rate for collecting the fine dust.

Figure 10:
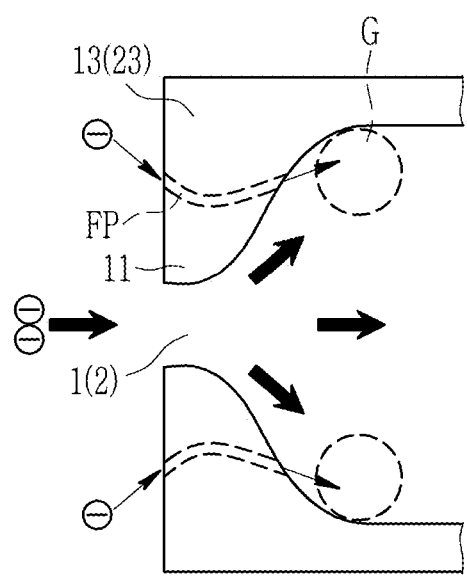
FIG. 10 illustrates a cross-sectional view of a venturi provided at an inlet of an air pipe (guide) installed in FIG. 7 and FIG. 8.

FIG. 10 illustrates a cross-sectional view of a venturi provided at an inlet of an air pipe (guide) installed in FIG. 7 and FIG. 8. Referring to FIG. 10, the air pipe 10, that is, the first and second inlets 1 and 2 of the guide 31 (23) further include a micropath FP at opposite sides intersecting a flow direction of the first and second inlets 1 and 2 in addition to a shape of a venturi 11 provided therein.

The micropath FP may penetrate a convex portion of the venturi 11 in the flow direction. Accordingly, the micropath FP allows a small amount of flow from a vicinity, e.g., a side of the first and second inlets 1 and 2, to flow into the air pipe 10, i.e., a recess portion G included inside the guide 31 (23).

Accordingly, a pressure of the air flow is reduced in the recess portion G positioned at an outside that intersects a center of a flow direction of the first and second inlets 1 and 2, that is, an inside of the air pipe 10. Through this, a larger flow may be sucked through the first and second inlets 1 and 2.

When the vehicle is driven, the sucked non-exhaust fine dust may be charged with the first polarity caused by friction between the tire of the asphalt and the wheel, and between the brake pad and the disk pad.

Friction electricity is a phenomenon in which electrons move from one object (electron donator) to another object (electron withdrawer) by rubbing the two objects with different properties, and the electron donator has a positive charge, while the electron withdrawer has a negative charge according to the friction electricity.

In a running vehicle, through the heat of charging of friction electricity, tires and brake pads of a wheel have a great ability to accept a charge, and a road surface (silica, cement, asphalt) and the disk pad have a great ability to lose a charge.

Accordingly, the fine dust may be charged due to the frictional electricity between the tire and the asphalt and the frictional electricity between the brake pad and the disk pad, and the fine dust generated and charged using the friction electricity is route controlled through an electric field charged with the opposite polarity in the air pipe 10 or the dust collector 51 (52). Therefore, the fine dust may be effectively collected.

The dust collector 51 (52) may collect fine dust charged through a plurality of charging plates 512, that is, a multi-plate, and an exchangeable fine dust filter F is provided on the charging plates 512, and thus it is possible to effectively collect the fine dust flowing between the charging plates 512.

As described above, according to an exemplary embodiment, collection of fine dust generated and charged by friction between the tire and the asphalt and between the brake pad and the disc pad of the wheel may be closely related to the generation of fine dust around a metropolitan area and large cities so as to directly help the public's health.

According to an exemplary embodiment, fine dust generated from a brake may be collected, leading to preemption of technique export and global market. In addition, according to results of analyzing the flow around the brake, it is possible to reduce a scattering rate of dust generated from the brake pad and the disk pad by designing a shape considering the flow path by a brake assembly manufacturing company in the future. That is, an exemplary embodiment may guide a design of environmentally-friendly brakes.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

| | |
|---|---|
| 1, 2: first, second inlet | 3: outlet |
| 4: filter | 10: air pipe |
| 11: venturi | 12, 22: wheel well |
| 13, 23: guide | 20: tire |
| 30: asphalt | 31: first outlet |
| 32: second outlet | 40: wheel |
| 41: front wheel | 42: rear wheel |
| 51, 52: dust collector | 61: side seal |
| 62: rear body | 511: duct |
| 512: charged plate | F: exchangeable fine dust filter |
| FP: micropath | G: recess portion |
| P1, P2: first, second stagnation point | |
| −: charged fine dust | |
| +: electric field | |

What is claimed is:

1. A non-exhaust fine dust collecting apparatus using frictional electricity, comprising;
   an air pipe mounted in a vehicle and provided with an inlet through which fine dust generated in a vehicle and charged with a first polarity flows together with air; and
   a dust collector mounted at a side of an outlet of the air pipe and charged with a second polarity that is opposite to the first polarity to collect the fine dust charged with the first polarity,
   wherein
   the inlet is formed at a position where a rate of air flow between a wheel and a wheel well slows down and is stagnant.

2. The non-exhaust fine dust collecting apparatus of claim 1, wherein
   the air pipe includes a wheel well of the vehicle and a guide mounted to the wheel well,
   the inlet is formed toward the guide to open toward the wheel disposed inside the wheel well, and
   the outlet opens toward a rear side of the wheel.

3. The non-exhaust fine dust collecting apparatus of claim 1, wherein
   the inlet includes
   a first inlet configured to open downward to face a first stagnation point that is formed vertically above a central axis of the wheel, and
   a second inlet configured to open forward to face a second stagnation point that is formed at a horizontal rear side from the central axis of the wheel.

4. The non-exhaust fine dust collecting apparatus of claim 3, wherein
the outlet includes
a first exit formed as a vertical gap between a lower end of the guide and a lower end of the wheel well at a rear side of the guide, to open a rear side thereof, and
a second exit formed as a horizontal gap between the first exit and the dust collector at a rear side of the first exit, to open a rear side thereof.

5. The non-exhaust fine dust collecting apparatus of claim 4, wherein
the dust collector is spaced rearward from the first exit to form the second exit, and is installed in a side sill or a rear body of the vehicle.

6. The non-exhaust fine dust collecting apparatus of claim 1, wherein
the fine dust is charged with the first polarity caused by friction between a tire on asphalt and the wheel or between a brake pad and a disk pad.

7. The non-exhaust fine dust collecting apparatus of claim 1, wherein
the dust collector includes
a duct configured to pass a flow of the fine dust,
a plurality of charging plates installed inside the duct to be charged with the second polarity by applying a charging voltage, and
a plurality of filters respectively installed on the plurality of charging plates to collect fine dust.

8. A non-exhaust fine dust collecting apparatus using frictional electricity, comprising;
an air pipe mounted in a vehicle and provided with an inlet through which fine dust generated in a vehicle and charged with a first polarity flows together with air; and
a dust collector mounted at a side of an outlet of the air pipe and charged with a second polarity that is opposite to the first polarity to collect the fine dust charged with the first polarity,
wherein
the air pipe further includes a venturi inside the inlet.

9. The non-exhaust fine dust collecting apparatus of claim 8, wherein
the air pipe further includes a micropath at opposite sides of the inlet, and
the micropath allows air to flow from outside of the inlet to a recess portion of a venturi disposed inside the air pipe.

10. A non-exhaust fine dust collecting apparatus using frictional electricity, comprising;
an air pipe mounted in a vehicle and provided with an inlet through which fine dust generated in a vehicle and charged with a first polarity flows together with air; and
a dust collector mounted at a side of an outlet of the air pipe and charged with a second polarity that is opposite to the first polarity to collect the fine dust charged with the first polarity,
wherein
the air pipe and the inlet are installed by analyzing a streamline of an air flow formed between a wheel and a wheel well of the vehicle, and
wherein
the inlet is disposed at a stagnation point where a rate of the air flow is slow and it is stagnant by allowing a movement of the wheel rotating in a first direction to act on the air flow flowing in an opposite direction to the first direction.

* * * * *